(12) United States Patent
Moreira da Mota et al.

(10) Patent No.: US 11,128,734 B2
(45) Date of Patent: Sep. 21, 2021

(54) CONFIGURING A COMMUNICATION SYSTEM USING ANALYTICS OF A RESTFUL API IN A NETWORK OF MOVING THINGS

(71) Applicant: Veniam, Inc., Mountain View, CA (US)

(72) Inventors: Eduardo da Cruz Antunes Moreira da Mota, Vila Nova de Gaia (PT); João Pedro Coelho de Azevedo, Cacém (PT); Dário Fernando Rodrigues Nascimento, Lisbon (PT)

(73) Assignee: VENIAM, INC., Mountain View, CA (US)

( * ) Notice: Subject to any disclaimer, the term of this patent is extended or adjusted under 35 U.S.C. 154(b) by 340 days.

(21) Appl. No.: 15/398,925

(22) Filed: Jan. 5, 2017

(65) Prior Publication Data

US 2017/0331921 A1    Nov. 16, 2017

Related U.S. Application Data

(60) Provisional application No. 62/334,086, filed on May 10, 2016.

(51) Int. Cl.
*H04L 29/08* (2006.01)
(52) U.S. Cl.
CPC ............ *H04L 67/327* (2013.01); *H04L 67/02* (2013.01)
(58) Field of Classification Search
CPC ......... H04L 67/32; H04L 43/10; H04L 67/02; G06F 11/3409
USPC ....................................................... 709/226
See application file for complete search history.

(56) References Cited

U.S. PATENT DOCUMENTS

| | | | | |
|---|---|---|---|---|
| 7,823,187 B2 * | 10/2010 | Tanaka | .................. | H04L 9/0891 726/1 |
| 8,719,419 B2 * | 5/2014 | Usmani | ............... | G06F 11/3688 709/225 |
| 9,277,352 B1 * | 3/2016 | Ward | ..................... | H04L 67/02 |
| 9,319,897 B2 * | 4/2016 | Gupta | .................... | H04W 12/12 |
| 9,462,547 B2 * | 10/2016 | Zhang | ............... | H04W 52/0216 |
| 9,483,570 B2 * | 11/2016 | Connan | .................... | H04L 67/42 |
| 9,542,556 B2 * | 1/2017 | Sanders | .............. | H04L 63/1425 |
| 9,608,990 B2 * | 3/2017 | Kobayashi | .......... | H04L 63/0807 |
| 9,720,746 B2 * | 8/2017 | Zhu | ......................... | H04L 67/32 |
| 9,832,268 B2 * | 11/2017 | Mehra | ................. | H04L 67/1097 |
| 9,904,725 B1 * | 2/2018 | Hedges | ................. | G06F 16/288 |
| 10,055,797 B2 * | 8/2018 | Kunapuli | ............... | G06Q 40/12 |
| 10,146,936 B1 * | 12/2018 | Khanduja | ............. | G06F 21/552 |
| 10,348,739 B2 * | 7/2019 | Greenspan | ............ | H04L 63/126 |
| 10,498,857 B2 * | 12/2019 | Thompson | .......... | H04L 41/0823 |
| 2011/0093870 A1 * | 4/2011 | Sharma | ................. | G06F 9/5077 719/328 |
| 2011/0282980 A1 * | 11/2011 | Kumar | ................ | H04L 67/1002 709/223 |

(Continued)

*Primary Examiner* — David P Zarka
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

16 Claims, 12 Drawing Sheets

(56) References Cited

U.S. PATENT DOCUMENTS

| | | | |
|---|---|---|---|
| 2012/0323844 A1* | 12/2012 | Chatley | H04L 67/1097 707/609 |
| 2013/0086210 A1* | 4/2013 | Yiu | H04L 63/0815 709/217 |
| 2013/0159449 A1* | 6/2013 | Taylor | G06F 15/167 709/212 |
| 2014/0108745 A1* | 4/2014 | Bernbo | G06F 3/0607 711/151 |
| 2014/0379823 A1* | 12/2014 | Wilsher | H04L 12/2856 709/206 |
| 2015/0128156 A1* | 5/2015 | Zhu | G06F 11/302 719/328 |
| 2015/0135275 A1* | 5/2015 | Matsugashita | H04L 63/104 726/4 |
| 2015/0189005 A1* | 7/2015 | Dubois | H04L 67/141 709/217 |
| 2015/0208344 A1* | 7/2015 | Zhang | H04W 52/0216 370/311 |
| 2015/0222485 A1* | 8/2015 | Key | H04L 67/02 709/221 |
| 2015/0271299 A1* | 9/2015 | Bullotta | G06F 16/00 709/230 |
| 2015/0334043 A1* | 11/2015 | Li | H04L 12/6418 709/213 |
| 2016/0050128 A1* | 2/2016 | Schaible | H04L 67/12 709/218 |
| 2016/0103750 A1* | 4/2016 | Cooper | G06F 9/542 719/328 |
| 2016/0248887 A1* | 8/2016 | Fardig | H04L 67/42 |
| 2016/0285858 A1* | 9/2016 | Li | G06F 21/41 |
| 2017/0078452 A1* | 3/2017 | Verrijt | G06F 9/541 |
| 2019/0090174 A1 | 3/2019 | Rocci et al. | |

\* cited by examiner

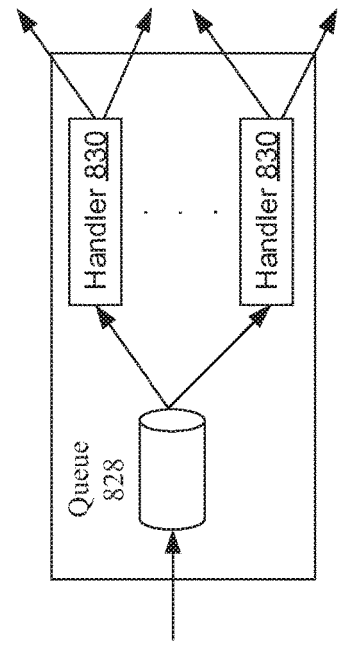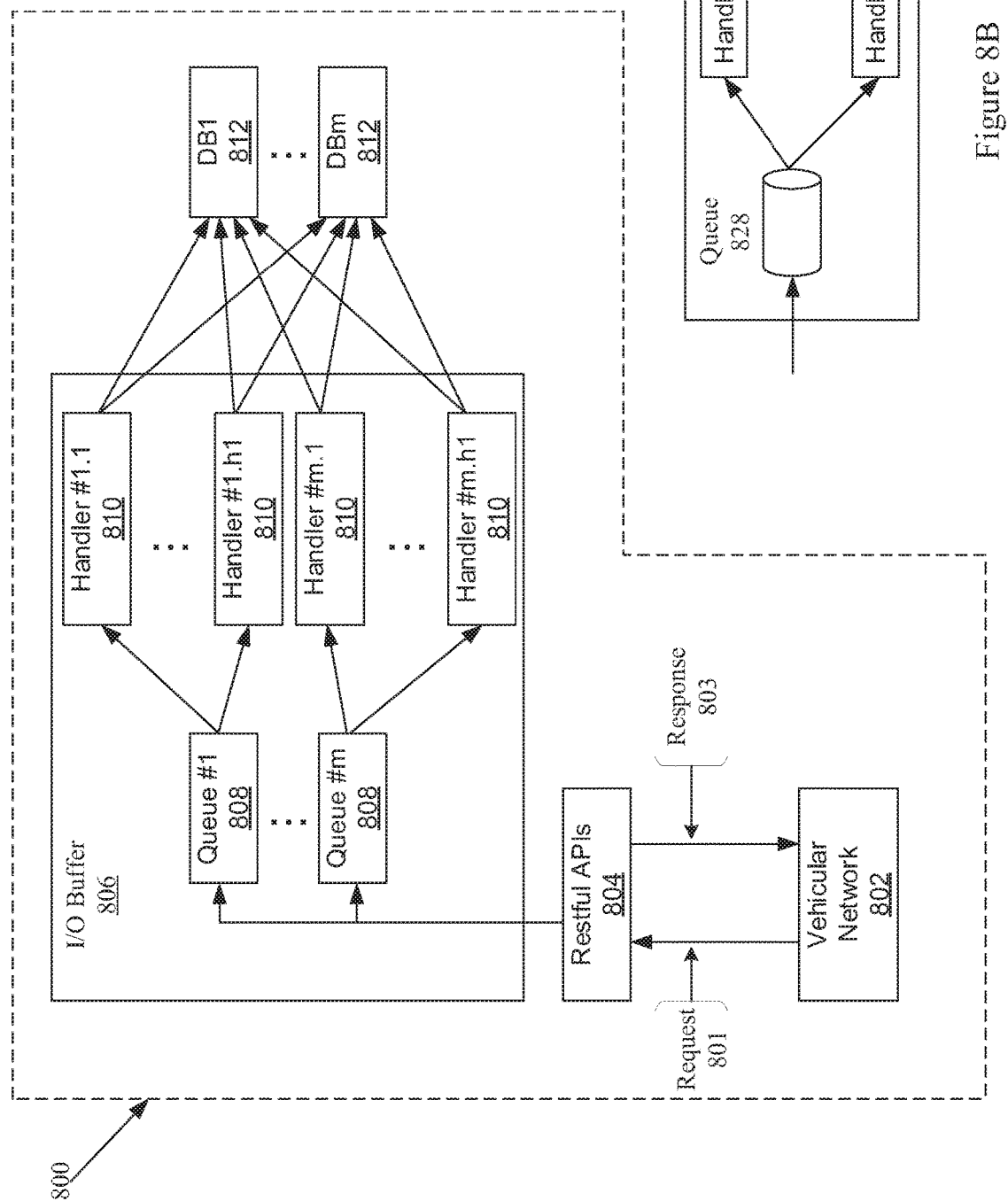

CONFIGURING A COMMUNICATION SYSTEM USING ANALYTICS OF A RESTFUL API IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Application Ser. No. 62/334,086, filed on May 10, 2016, and titled "Systems and Methods to Improve Handling of User Requests in a Network of Moving Things," which is hereby incorporated herein by reference in its entirety.

This patent application makes reference to U.S. Provisional Patent Application Ser. No. 62/222,192, filed on Sep. 22, 2015, and titled "Communication Network of Moving Things," which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things). Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 8A shows a block diagram of example communication with a vehicular network handled by RESTful APIs, in accordance with an example embodiment of the disclosure.

FIG. 8B shows a block diagram of an example I/O Buffer, in accordance with an example embodiment of the disclosure.

SUMMARY

Figure 1:
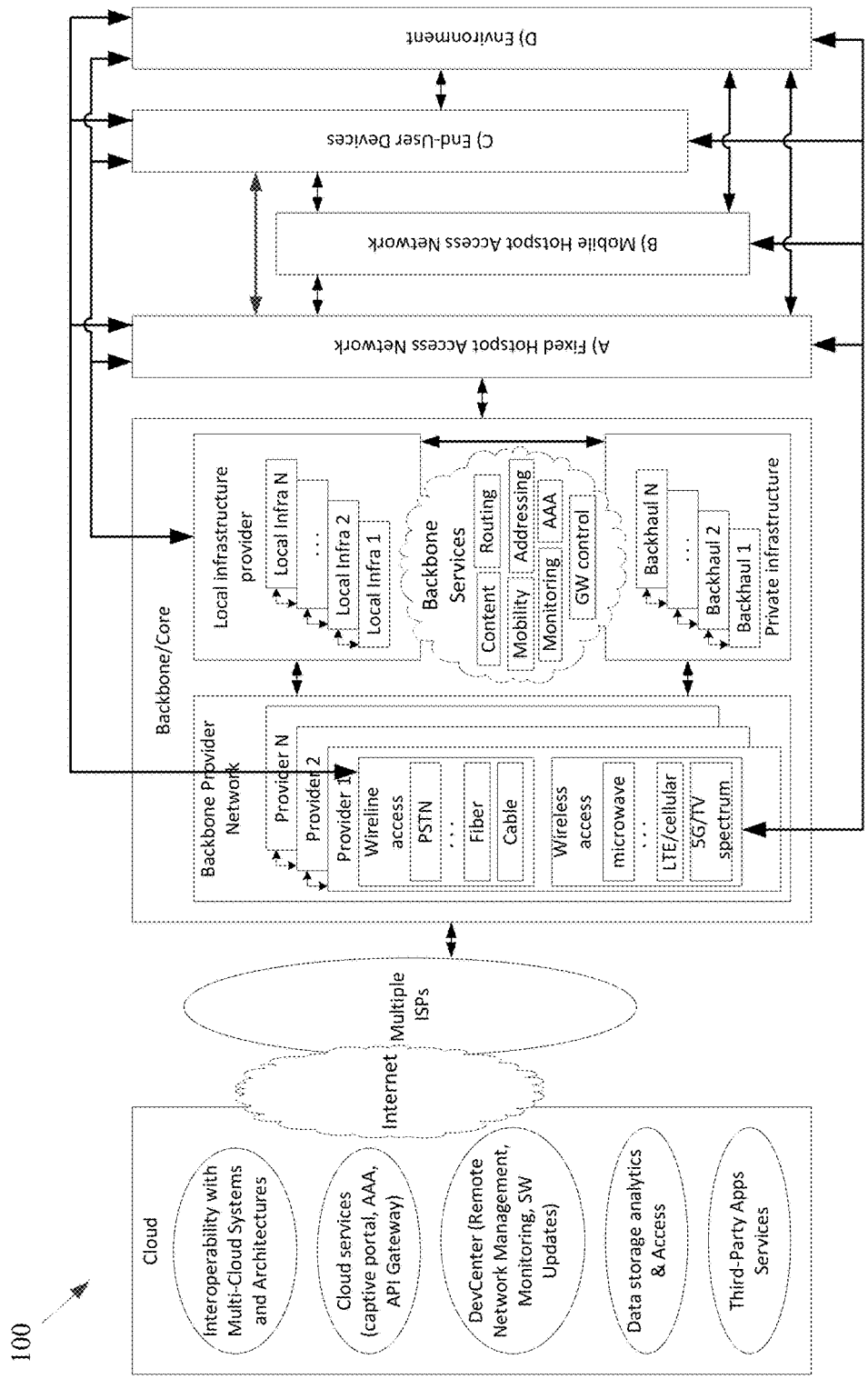
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or." As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.).

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, Fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10x the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or Fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles. Such sensors may, for example, comprise positioning sensors (e.g., GPS sensors, Galileo sensors, GLONASS sensors, etc.). Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, trucks' positions and engines' status, and then be able to provide real-time notifications to drivers (e.g., to turn on/off the engine, follow the right route inside the harbor, take a break, etc.), thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example networks and/or network components 200, 300, 400, 500-570, 600, 700, and 800, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
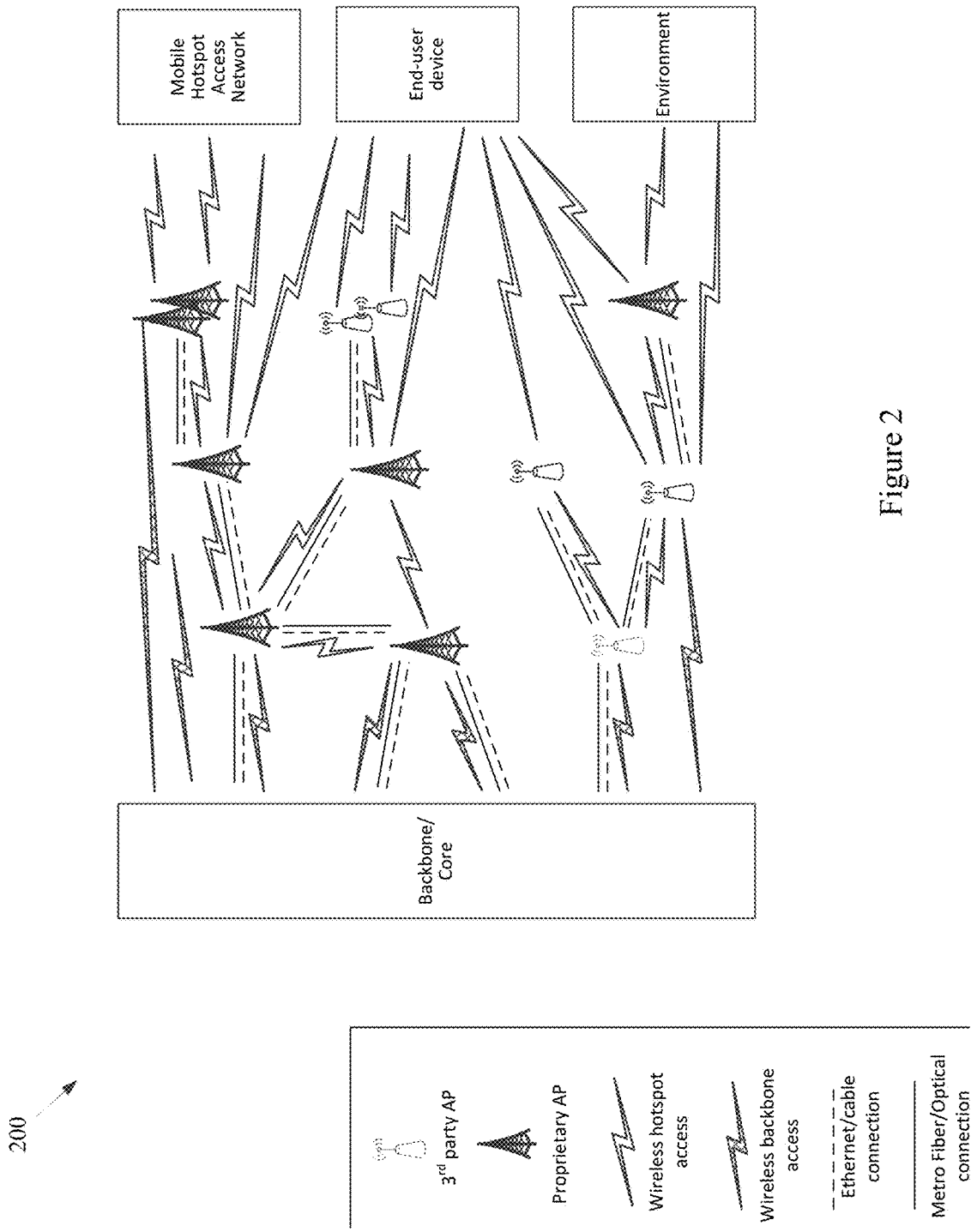
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example networks and/or network components 100, 300, 400, 500-570, 600, 700, and 800, discussed herein.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
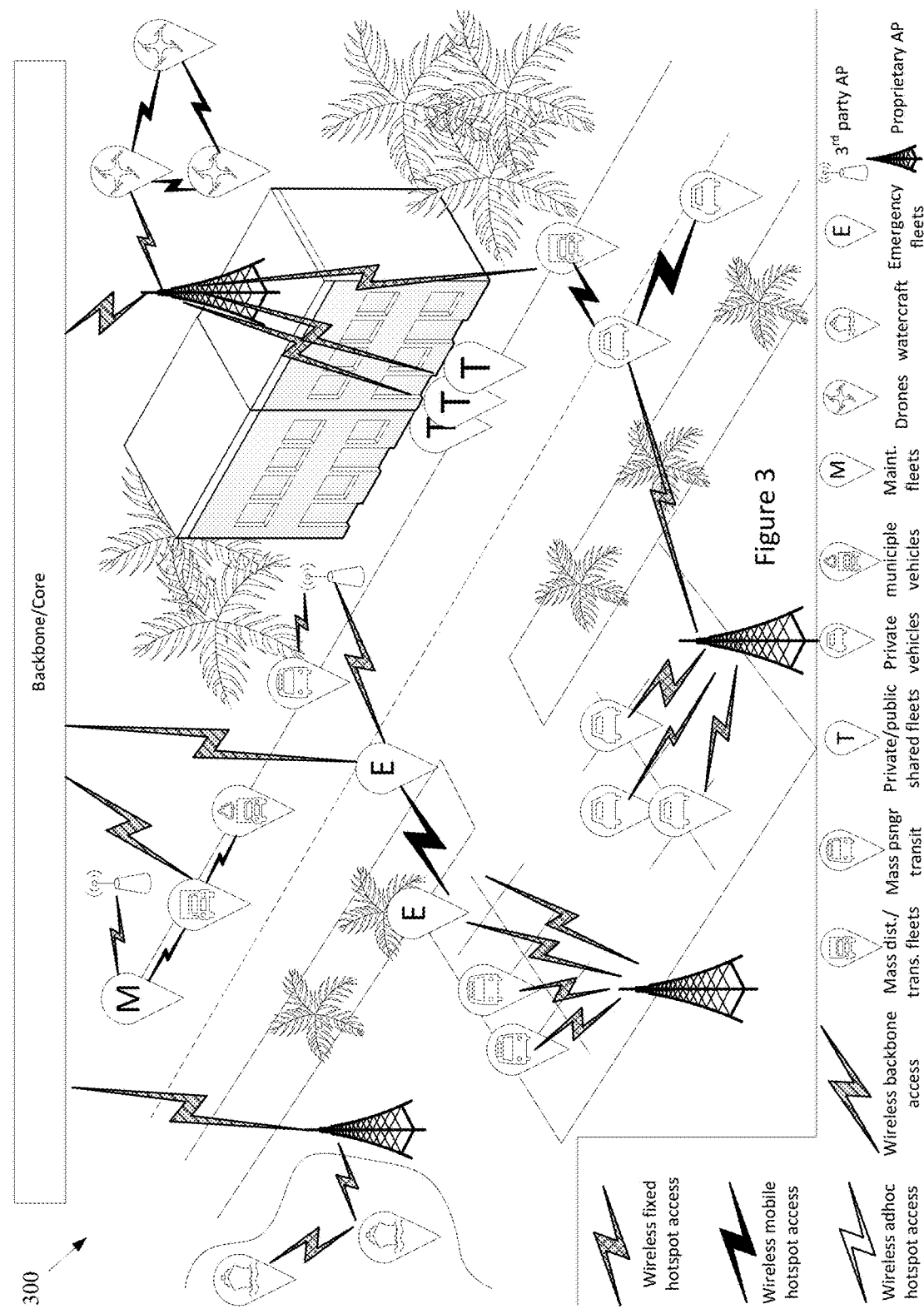
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example networks and/or network components 100, 200, 400, 500-570, 600, 700, and 800 discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
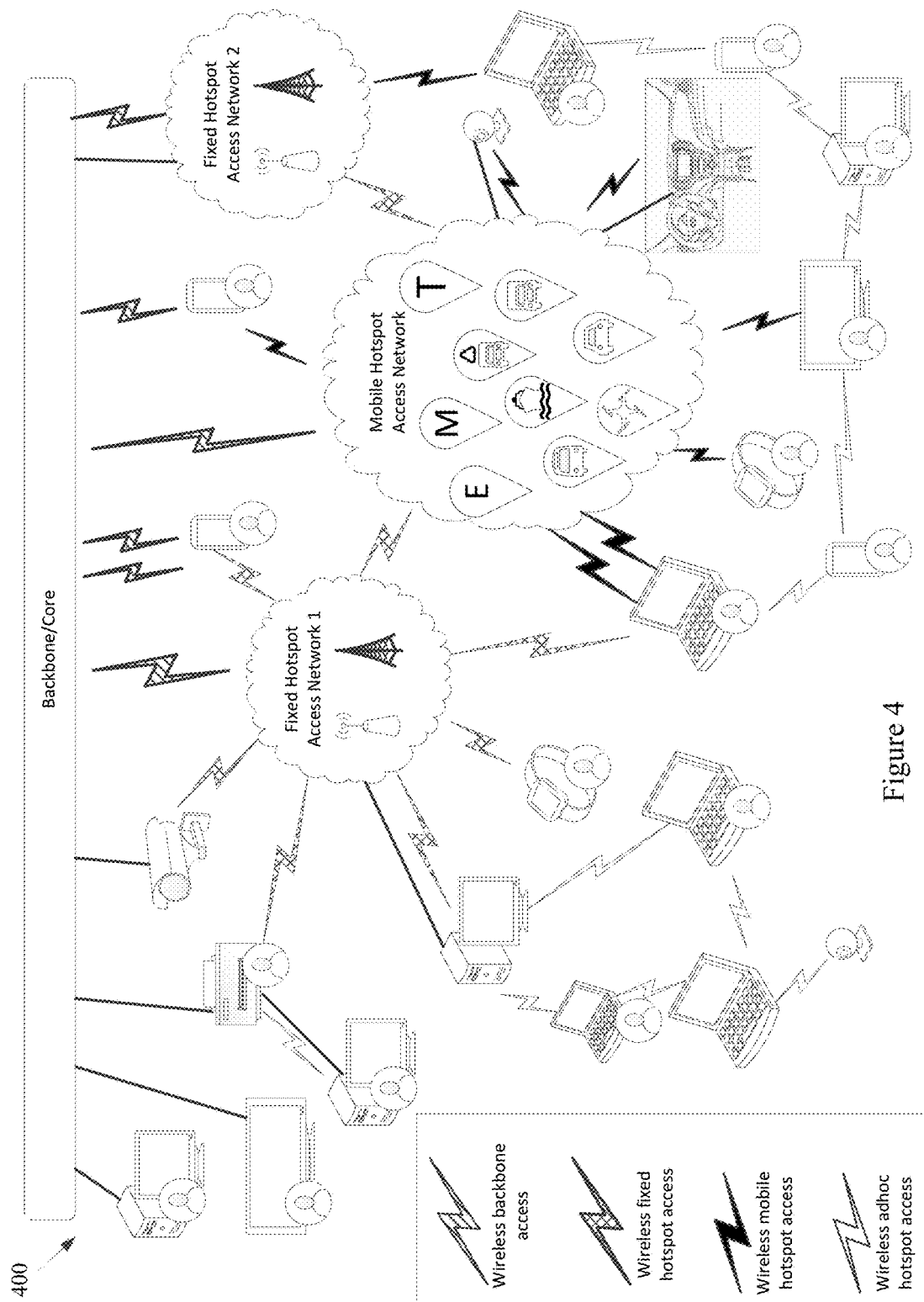
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example networks and/or network components 100, 200, 300, 500-570, 600, 700, and 800, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
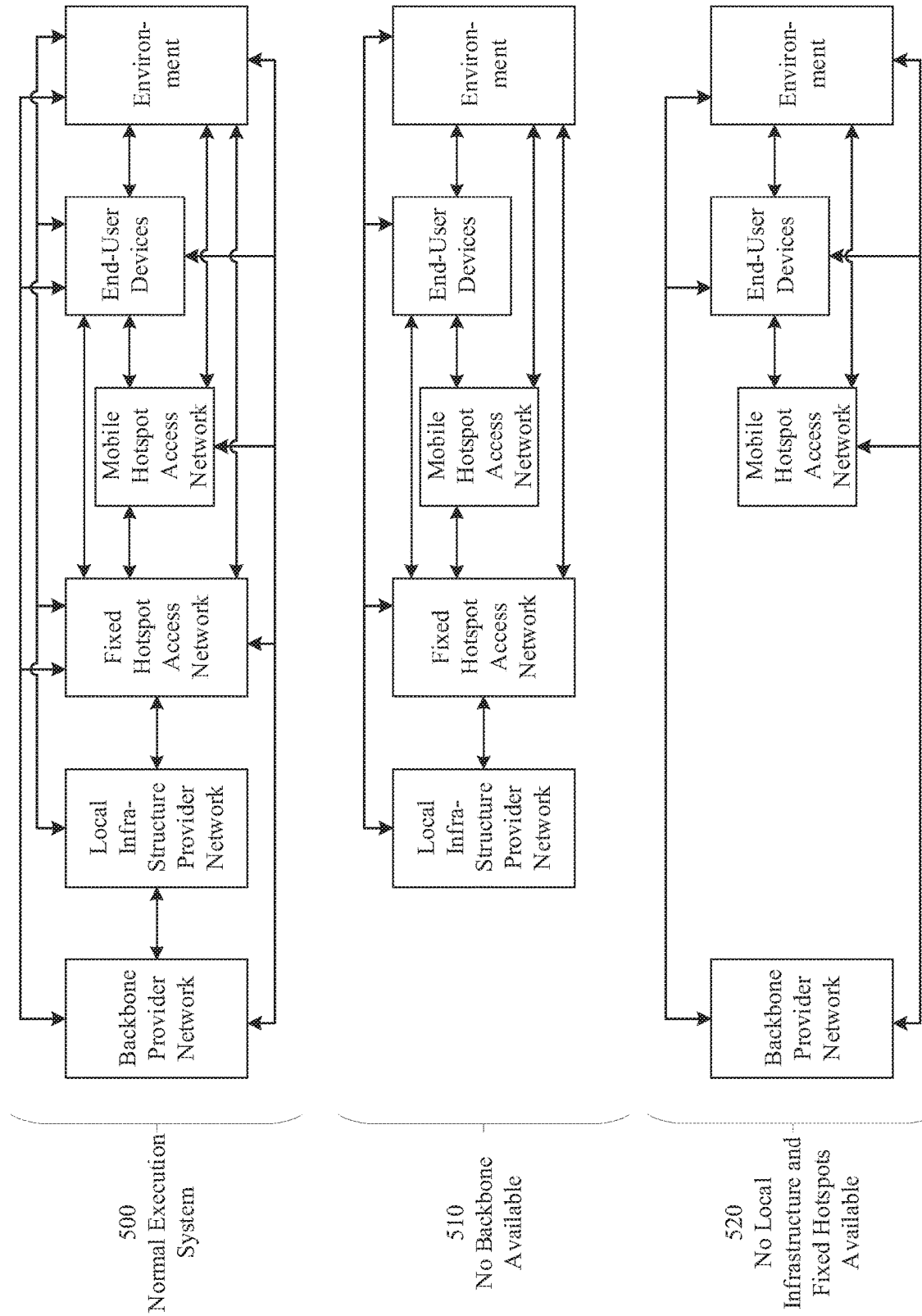
FIGS. 5A-5C show a plurality of network configurations illustrating the flexibility and/or and resiliency of a communication network, in accordance with various aspects of this disclosure.
Figure 5B:
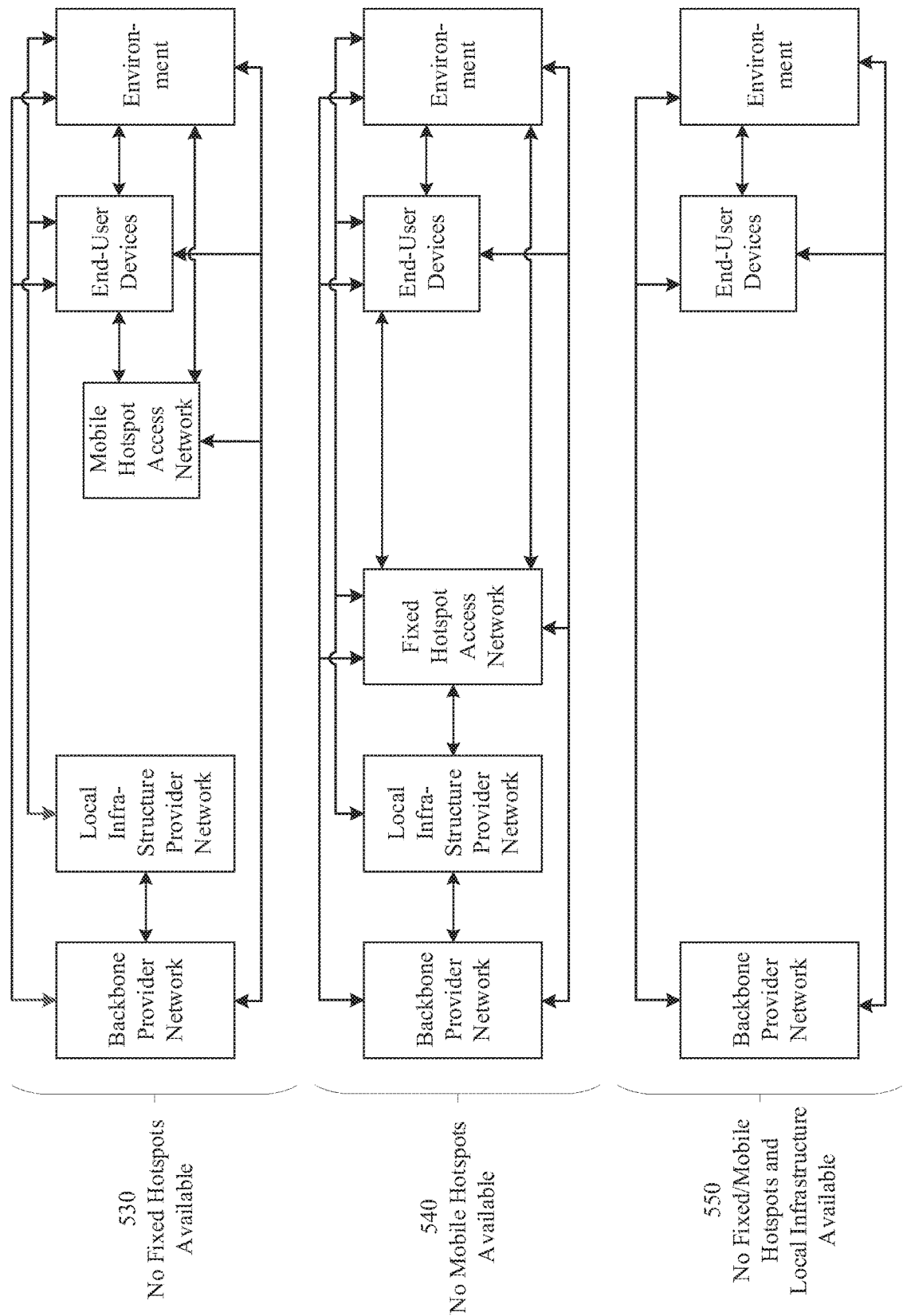
Figure 5C:
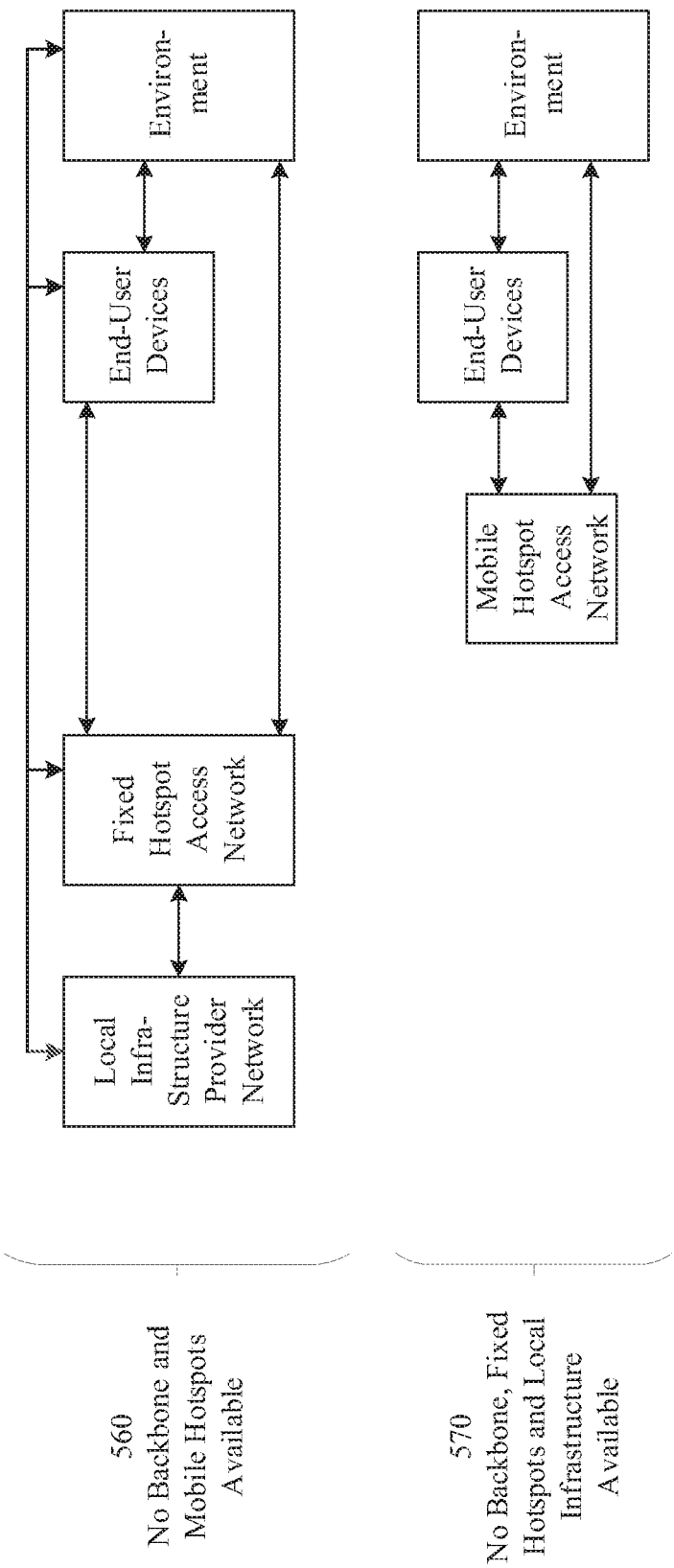

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example networks and/or network components 100, 200, 300, 400, 600, 700, and 800, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
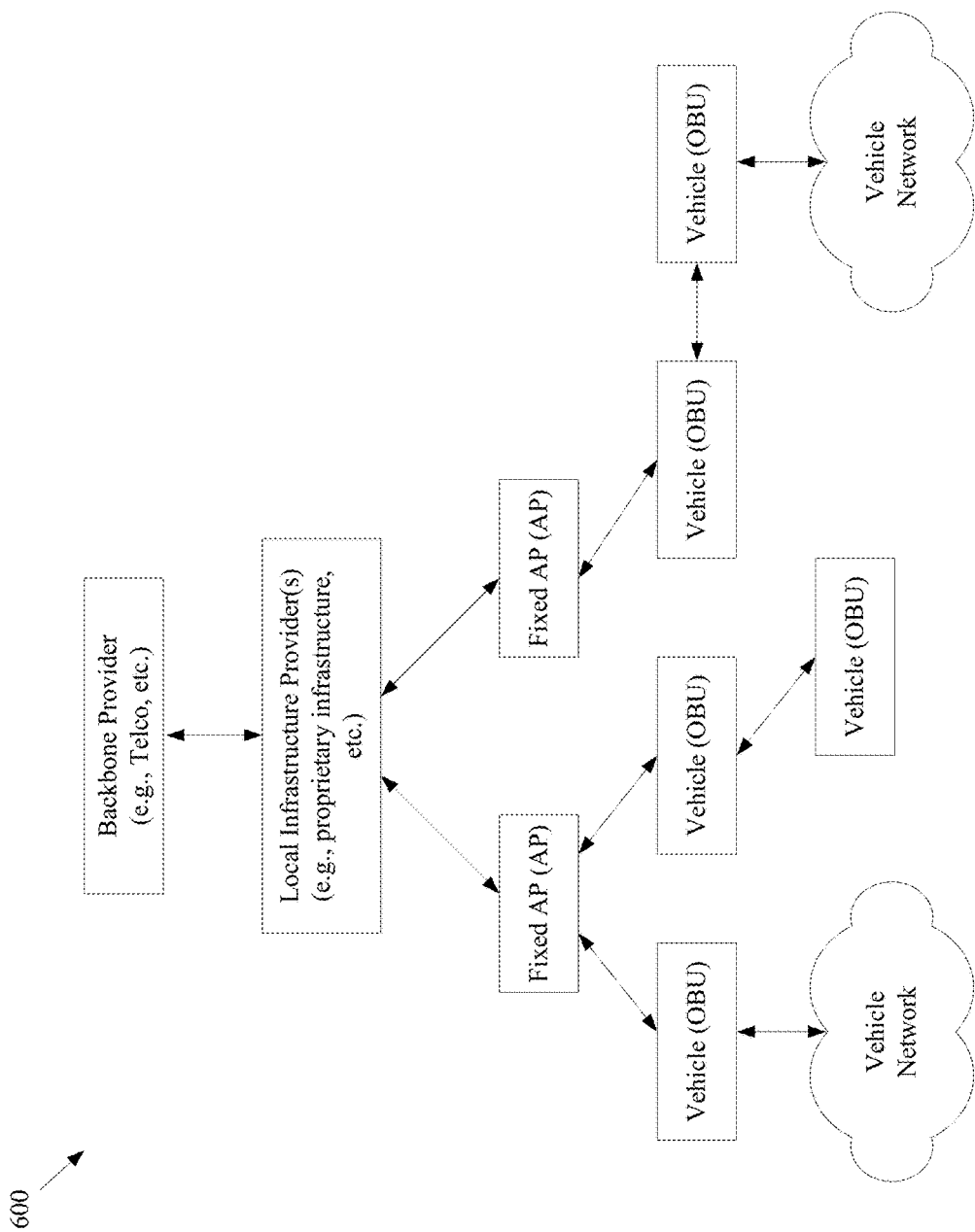
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example networks and/or network components 100, 200, 300, 400, 500-570, 700, and 800 discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

A deployment of a communication structure, described at least in part above, may be an independent infrastructure comprising Mobile APs and Fixed APs. Various vehicular networks within a common geographic region may send their real-time and/or delay-tolerant requests to a shared, unique cluster of servers. Real-time data may need to be processed as soon as possible, whereas delay-tolerant data may be processed when the servers can handle such requests.

A system where requests are fulfilled based on their metadata may allow prioritizing the requests. The priority may be set, for example, by a quality of service (QoS) associated with the data, where more may be charged for service with higher QoS than for service with lower QoS. Accordingly, the data associated with higher QoS may be processed faster or in real-time, as opposed to the data flowing through a delay-tolerant chain for data associated with a lower QoS. The QoS of the data may also be determined by the nature of the data or by the network from which the data originates and/or is destined for.

Most of the communication between the physical nodes of the various networks and the Cloud may be done, for example, by issuing HTTP requests. The Cloud, as defined above for example, may refer to one or more networked servers coupled to any portion of a network. The Cloud may be at least a part of one or more embodiments of the present disclosure. To handle the HTTP requests, the Cloud may comprise HTTP servers that may open a set of endpoints (addresses within the scope of that host) to which each Mobile/Fixed AP connects as HTTP clients when they need to publish information to the Cloud. Therefore, a server may need to reply to each AP as quickly as possible by delegating all I/O operations such as, for example, flushing data to the databases, to other servers.

Figure 7:
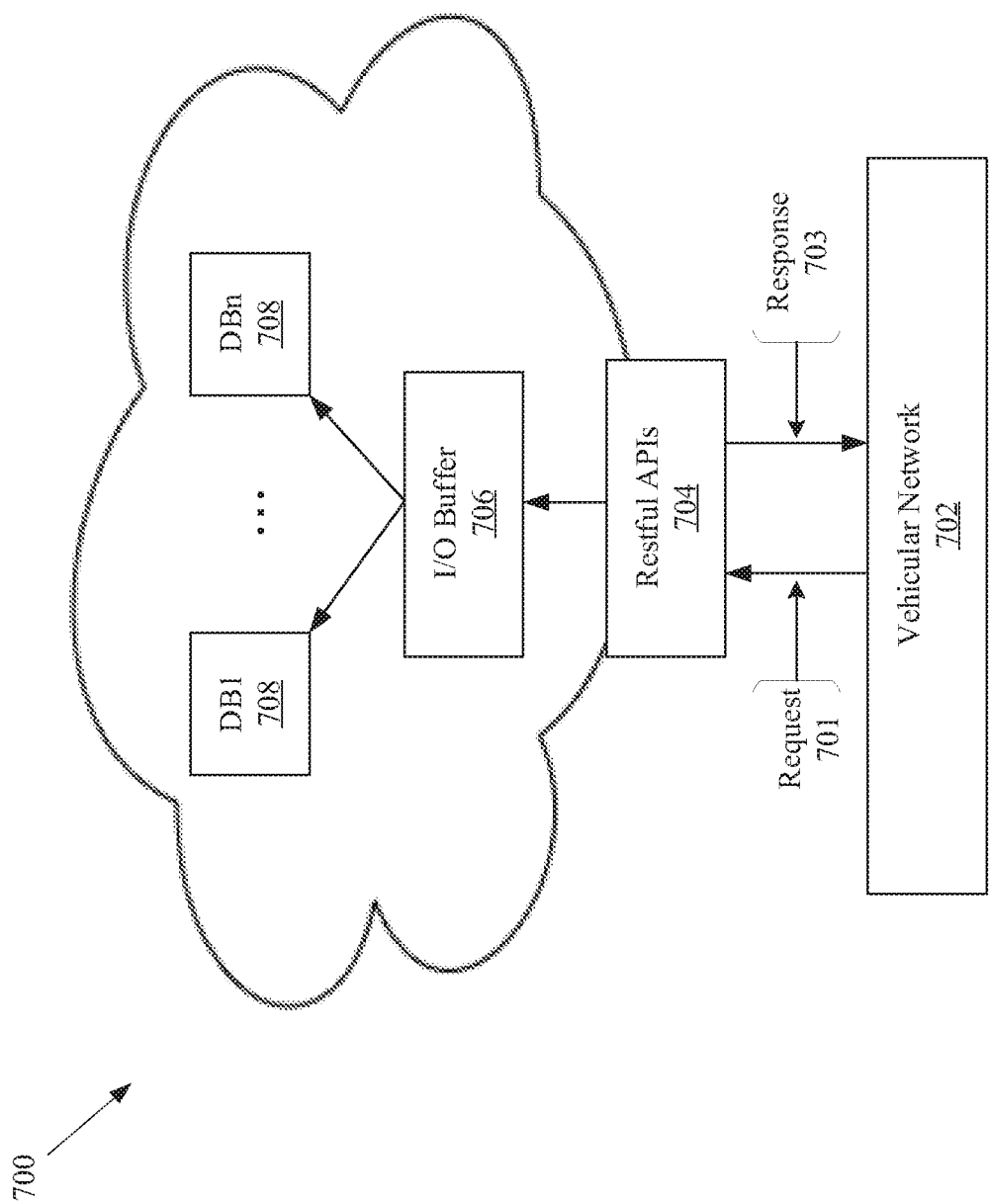
FIG. 7 shows a block diagram of example communication between a vehicular network and another communication network.

FIG. 7 illustrates a block diagram of example communication between a vehicular network and another communication network. The example network 700 may, for example, share any or all characteristics with the other example networks and/or network components 100, 200, 300, 400, 500-570, 600, and 800 discussed herein. Referring to FIG. 7, a request 701 may be sent from a particular node in the vehicular network 702 to the Cloud via Representational State Transfer (RESTful) APIs 704. The RESTful APIs 704 may be used to provide access to the various HTTP servers in the Cloud. The request 701 may be served by an appropriate HTTP server with the RESTful APIs 704 and the HTTP server may send a response 703 to the node in the vehicular network 702 that sent the request 701. The request 701 may be, for example, to access data from one or more of the databases 708 ($DB_1 \ldots DB_n$). The request 701 may be sent to the I/O Buffer 706 to be handled according to the priority of the request 701.

Various embodiments may send different messages from the RESTful APIs 704 to the I/O Buffer 706. For example, the request 701 may be sent directly, or another message may be sent regarding the request 701 where the request 701 may be stored in some memory location identified by the message, or the message may include the request 701. The specific message sent and/or the method of sending the message may be design and/or implementation dependent.

Various embodiments of the disclosure may use different architectures for the RESTful APIs, the HTTP servers, the database servers, the databases, etc. For example, one architecture may comprise in the Cloud one or more RESTful API servers, one or more HTTP servers, and one or more database servers where each database server may control one or more databases. The number of each type of servers may vary, for example, by dynamically taking the servers and/or databases online or offline (scaling) as demand changes or an area of service changes. Reducing the number of servers and or databases in a specific network infrastructure may allow for reduction in fixed hardware costs and maintenance costs. A server and/or a database may also be allocated from service for one network to service for another network as needs change, where the networks being served may be, for example, mobile networks including vehicle networks and/or fixed networks.

Other architectures may have, for example, one server performing multiple functions, such as performing as an API server and as an HTTP server, or performing as an HTTP server and a database server, etc. Still another architecture may have one server performing as an API server, an HTTP server, and a database server. The number of APIs in a server, the number of HTTP endpoints opened by a server, and the number of databases controlled by a database server may vary due to different architectures and/or needs at any given time. Various architectures may have the databases attached (in the same physical location) to the database server while other architectures may have the databases detached (at a different physical location) from the database server.

Various embodiments of the disclosure may enable a deployed network to efficiently communicate with the Cloud. The Cloud may be able to, for example, preemptively schedule I/O operations related to how/when the data to/from a node such as a mobile/fixed AP is stored/retrieved. The Cloud may be able to process bursts of information, normally defined, for example, as the reception of large amounts of delay-tolerant data, and to ensure that there are enough hardware resources, thus minimizing server overloading, and delay of real-time data.

The Cloud may be able to automatically learn and detect when something is not working as expected with the requests coming from a particular client/vnetwork/AP. Customers to the Cloud may be able to subscribe to certain types of data, and to be assured that time-bounded constraints regarding the validity of such data are met. The Cloud may, for example, comprise the infrastructure that collects, processes, stores, analyzes and delivers data from/to third-parties or the network.

Such ecosystem may comprise, for example, HTTP Restful APIs, I/O buffers, captive portals, Veniam monitoring tools, VPNs, databases (DBs), and the like. In various embodiments, the HTTP Restful APIs may collect/deliver content from/to the network. These APIs open a set of endpoints (addresses within the scope of that host) to which each AP connects as HTTP clients whenever they need to publish information to the cloud, and from which various UIs can receive data to display to any customers. The data may be stored in, for example, databases (DBs). A DB may be a mass storage device such as, for example, one or more hard disks.

With an ever increasing volume of data sent between the nodes and the Cloud, the HTTP Restful APIs may need to respond quickly. However, if a DB stores data in, for example, hard disks, the write cycle to the hard disk may be longer than sending messages via a cabled network. Accordingly, I/O buffers may be used in various embodiments to decouple the I/O oriented logic from the network-oriented logic. Therefore, the APIs may be able to reliably forward the I/O write requests to a different server and reply to the APs right away, while the data to be stored may be written to the hard disk (DB) at a later time by the different server. The specific algorithm of determining when any data is written to the hard disk may be design and/or implementation dependent. Similarly, data requests may be delayed for those requests that are associated with low QoS origins. This may occur, for example, at various parts of the network including at the database server.

In various embodiments, a captive portal may provide static HTML content to the users as soon as they connect to a WiFi service provided by an infrastructure, such as an infrastructure according to various embodiments of the disclosure.

Various embodiments of the disclosure may provide monitoring tools via the user interfaces to display one or more analytics regarding the network(s) as served by the HTTP RESTful APIs. The network(s) may be monitored by, for example, one or more analytic tools in one or more nodes or servers of the network(s). Various embodiments may encompass differently sized networks including, for example, using VPNs for a worldwide infrastructure that may be connected to a single private network, and where the VPNs may be able to share sensitive resources.

Various embodiments of the disclosure may offer connectivity among heterogeneous clusters of nodes. Vehicles may disseminate data either to each other or to the infrastructure using, for example, dedicated short-range communication (DSRC) or cellular connections. The data may be, for example, as technical as software updates or diagnostics logs, and as general as Internet email traffic by users connected to the network. Various embodiments of the disclosure may have network(s) that leverage DSRC connections, which may be cheaper and have larger bandwidth than cellular connections. For example, delay-tolerant data may be disseminated through the wired connectivity provided by the fixed access points (FAPs), where the FAPs may be installed in strategic points to maximize DSRC coverage.

Some data may need to be delivered under tight, real-time constraints. Web content such as voice over IP delivered to some or all users of the WiFi service may be an example of real time data provided by networks according to various embodiments of the disclosure. For such cases, whenever DSRC connectivity is not available, cellular connectivity (which may be more expensive and slower) may be used.

Additionally, deployed APs (either fixed or mobile) may generate real-time data as well as delay tolerant data. Various embodiments of the disclosure may rely on a set of metrics produced by each node, and may determine whether a given node should be scheduled for intervention by human personnel. Some of this data may be subject to tight, real-time constraints. For instance, every AP may be programmed to regularly inform the servers that it is indeed on line, and thus able to provide the services it has been programmed to provide. Such information may not be valid if, for example, it is analyzed two hours after it was first published. On the other hand, other performance metrics, such as, for example, the total amount of traffic generated by a given AP, can be processed, for example, by the end of the day/week.

Accordingly, various nodes may with a range of different uses may communicate via the network(s) such as an individual operating, for example, a smartphone in a vehicle, a vehicle communicating with external devices/vehicles, or APs or HTTP servers providing status information on its operation.

It may be possible to characterize data as real-time data or delay tolerant data by various constraints associated with that data. Some of these constraints may be, for example, the type of data, QoS associated with the data, and the like. Real-time (RT) data may need to reach the Cloud as soon as possible and, once it does, may need to be processed as soon as possible. RT data may be typically lower bound by elements such as, for example, the time the request takes to reach the Cloud, the time the request takes to execute, etc.

Delay-tolerant (DT) data may not have RT constraints, and, therefore, may be sent opportunistically when certain conditions are met (e.g., when a vehicle is connected to the network via a DSRC connection). The time a DT message takes to be processed may usually be lower bound by elements such as, for example, the time a vehicle takes to ensure favorable conditions to send a message to the cloud; the time it takes for the Cloud server to process that file; the time it takes to parse a buffer of HTTP requests, and inject them into the HTTP server; the time the request takes to execute; etc.

Clients/nodes/vnetworks may be prioritized when arriving at the API, with particular prioritizing policies being based on particular context/environments that may be, for example, design and/or implementation dependent. As an example, the RESTful APIs shown in FIG. 8A may contain mostly routing logic, and heavy computation may be performed by, for example, a customizable tool that deals with queue management. This may allow the distribution of content to multiple consumers, such as, for example, storage of data in data warehouses, provide services with real-time data, provide third-parties with RT/DT data, provide redundancy of data via replication mechanisms, etc.

FIG. 8A shows a block diagram of example communication with a vehicular network handled by RESTful APIs, in accordance with an example embodiment of the disclosure. The example network 800 may, for example, share any or all characteristics with the other example networks and/or network components 100, 200, 300, 400, 500-570, 600, and 700 discussed herein. Prioritization may be promoted in various ways. Referring to FIG. 8A, there is shown a vehicular network 802, RESTful APIs 804, I/O Buffer 806, and databases 812. The I/O Buffer 806 may comprise queues 808 and handlers 810.

When prioritizing requests, real-time (RT) data may be typically processed before delay-tolerant (DT) data due to its time-constraints. This may be done, for example, by ensuring placement of RT content in queues with more handlers. A handler may be able to process one message at a time, and database-oriented handlers may typically reserve a connection until the whole process is complete. More handlers dedicated to a given queue may typically increase performance of that queue.

In some embodiments, a "consumer utilization" parameter may be internally computed to measure the availability of each consumer to retrieve messages from the server. For high throughput queues, a lower value for "consumer utilization" may indicate that eventually the handlers will not be able to consume the messages as they are being published.

This may lead to an ever increasing number of pending messages (this can be monitored by retrieving the message processing rates—publishing and consuming rates—from the queue manager). Unless bound by network limitations, the "consumer utilization" may be increased by deploying more handlers (consumers) to the queue.

In the example block diagram 800 showing communication with a vehicular network handled by RESTful APIs, a request 801 may be sent from a node (not shown) in a vehicular network 802. The node may be, for example, a communication device, associated with a passenger on a bus, using a MAP on the bus or other nearby vehicles or a FAP external to the bus. The request may comprise data that needs to be stored in the Cloud. The request 801 may be received by one of the RESTful APIs 804. The RESTful API 804 may then send a response 803 acknowledging the request 801 to the node in the vehicular network 802.

Depending on various parameters associated with the request 801, such as, for example, the type of data in the request 801, the QoS associated with the request 801, and the like, the request 801 may be placed into an appropriate one of the queues 808. The tasks stored in each of the queues 808 may be processed by the handlers 810, and each task may be completed with a specific database (DB) 812. The task may be, for example, storing data in a DB 812 or retrieving data from a DB 812.

The number of handlers 810 assigned to each queue 808 need not be the same. For example, a queue 808 for higher priority requests may have more handlers 810 than a queue 808 for lower priority requests. The number of handlers 810 and the number of queues 808 may vary depending on a specific configuration and possibly on data traffic.

Accordingly, it can be seen that the amount of time taken in handling the request 801 from the vehicular network 802 is dissociated with the response 803 sent back to the vehicular network 802. This may provide faster feedback to the user who was responsible for sending the request 801.

FIG. 8B shows a block diagram of an example I/O Buffer, in accordance with an example embodiment of the disclosure. In FIG. 8B, the I/O Buffer 826 may have a single queue 828 with multiple handlers 830. As stated previously, the number of handlers 830 for the single queue 828 may be different for different configurations and/or different data traffic. The I/O Buffer 826, the single queue 828 and the handlers 830 may be similar in function to the I/O Buffer 806, the queues 808 and the handlers 810

Figures 9A, 9B:
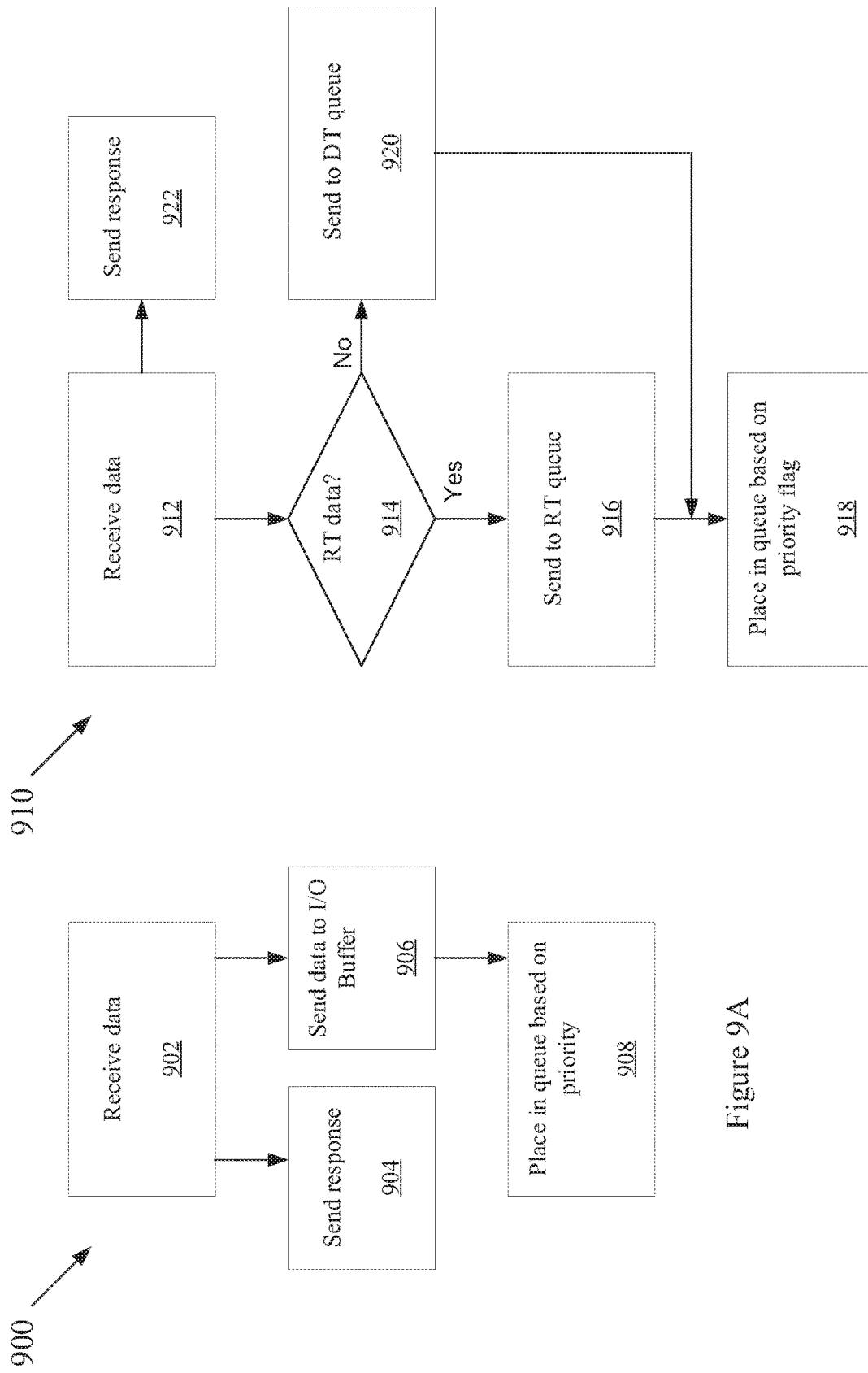
FIG. 9A shows a flow diagram of operation using one queue, in accordance with an example embodiment of the disclosure.
FIG. 9B shows a flow diagram of operation using multiple queues, in accordance with an example embodiment of the disclosure.

FIG. 9A shows a flow diagram of operation using one queue, in accordance with an example embodiment of the disclosure. The flow diagram 900 shown in FIG. 9A may be used by, for example, the example networks and/or network components 100, 200, 300, 400, 500-570, 600, 700, and 800 discussed herein. However, it should be understood that the flow diagram 900 is described as one example process that may be used, and various embodiments need not be so limited.

In an example embodiment, for client/node/vnetwork based prioritization, for a given data type (i.e., traffic information), all nodes within a single geographic region may communicate to the same I/O Buffer, and to the same queue. Additional meta-data may be provided along with the message body (i.e., the traffic values themselves). A priority flag may also be associated with each message such that the message is placed in the right place in the queue, and such that a message is only preceded by higher-priority messages.

In an example, two customers within the same geographic region may subscribe to location information. Customer A may subscribe to RT positioning, and customer B may subscribe to DT positioning. Prioritization allows RT messages that arrive later, but need to be processed first, to be placed in front of DT messages such that Customer A's location information is sent before Customer B's location information.

Referring to the flow diagram 900, at 902, a request 801 may be received by a RESTful API such as the RESTful API 804. At 904, the RESTful API 804 may send a response 803 to the request 801. At 906, the request 801 may be sent to an I/O Buffer such as, for example, the I/O Buffer 826. The request 801 may be placed in an appropriate part of the queue 828 to be handled by one of the handlers 830. The position of the request 801 in the queue may be determined, for example, by a QoS associated with the request 801, the type of data associated with the request 801, whether a priority flag is set for the request 801, and the like.

Various embodiments may have multiple values available for the priority flag, while other embodiments may only have a binary value of on for asserting priority and off for not asserting priority.

The handler 830 may then use one of the DBs 812 to either store data associated with the request 801 or provide the requested data.

FIG. 9B shows a flow diagram of operation using multiple queues, in accordance with an embodiment of the disclosure. The flow diagram 910 shown in FIG. 9B may be performed by, for example, the example networks and/or network components 100, 200, 300, 400, 500-570, 600, 700, and 800 discussed herein. However, it should be understood that the flow diagram 910 is described as one example process that may be used, and various embodiments need not be so limited.

The example embodiment described by the flow diagram 910 refers to, for example, requests that arrive at an HTTP server that has the RESTful APIs 804. Additional meta-data may be provided along with the message body (i.e., the traffic values themselves). A priority flag may be associated with each message such that the message is placed in the right place in the queue, and such that a message is only preceded by higher-priority messages.

Referring to the flow diagram 910, at 912, a request 801 may be received by a RESTful API such as the RESTful API 804. At 922, the RESTful API 804 may send a response 803. At 914, a determination may be made as to whether the request 801 involves real-time data. If so, at 916, the request 801 may be sent to a RT queue in the I/O Buffer 806. Otherwise, at 920, the request 801 may be sent to a DT queue in the I/O Buffer 806.

At 918, the request 801 may be placed in an appropriate part of the respective RT queue or DT queue, to be handled by one of the handlers 810. The position of the request 801 in the respective queue 808 may be determined by, for example, a QoS associated with the request 801, the type of data associated with the request 801, whether a priority flag is set for the request 801, and the like. The handler 810 may use one of the DBs 812 to either store data associated with the request 801 or provide the requested data.

Various embodiments may have multiple values available for the priority flag, while other embodiments may only have a binary value of on for asserting priority and off for not asserting priority.

The need to adapt the policies in the API may be detected and/or learned. This may comprise, for example, determining when to discard the requests from a specific client and/or when to adapt the rate assigned to a specific client. There may also be a need to detect when to adapt the policies in the queue manager such as, for example, determining when to setup more handlers. It may be useful to determine the learning mechanisms that are in place or should be in place to detect an anomaly on the requests received by each client. For example, historic data stored in a DB may be used to determine peak hours. A determination may be made, for example, on how to limit the rate the queue manager sets for the different requests based on the priority of data conveyed on the request/type of the request and the expected time to handle that request, etc.

The first interaction between the network and the Cloud may be via HTTP requests. Further interactions until the data is processed may be done by publishing messages to a cluster of consumers. Due to the nature of the network, the flow of messages may not be, for example, periodic. Rather, it may depend on factors such as whether the connection is via cellular, DSRC, or other networks, the availability of the several nodes in the network, the services subscribed by each customer, etc. Since customers may have the ability to change their subscription plans, the Cloud ecosystem may adapt and/or scale up/down, based on the computation effort that the Cloud ecosystem can commit to. Accordingly, actions by a user may change a priority of requests generated by the user at a node. Therefore, if the user changes the QoS (or other status) for the node, the priority of the requests from the node also changes.

Both preventive and resolutive mechanisms may also be used to adapt the policies that determine the ability for the I/O Buffers to scale. Preventive measures may analyze the historical data. This may provide insight as to the number of data producers (i.e., Apps), setup of content subscriptions, and how I/O Buffers behaved in the past. The analysis may be used to determine the number of handlers, whether the I/O Buffer was able to deliver the content appropriately, and whether there was any processing drag or delay at any point in time. Although the nodes may communicate through an undefined pattern, the performance of the entire system may be predicted, for example, based on historical data given a well-known setup (number of customers, RT subscriptions, volume of data, etc.). In the specific case of bus fleets, the path of the vehicles may also be predicted, and, therefore, the time they can take to offload delay-tolerant data to the Cloud. Artificial Intelligence mechanisms may also be implemented to determine whether the Cloud infrastructure needs to scale up to handle the amount of effort it is expected to handle. They may also be able to determine whether the infrastructure can safely scale down, thus saving hardware and maintenance costs while maintaining the desirable QoS.

Resolutive measures may be applied, for example, as a response to an unexpected behavior. For example, if the Cloud infrastructure never interacted with X number of customers/subscriptions, historical data may be of little-to-no use in predicting the expected effort the Cloud would be subject to. However, the number of pending messages to process, the convergence/divergence trend of the number of pending messages to/from zero, the rates of publishing/consuming messages may provide valuable insight to any monitoring platform. Ultimately, this may trigger the spawning of new handlers in order to mitigate undesirable behaviors.

Historical data may also provide a valuable insight to the overall performance of the network, either aggregated by a client or not, as it may allow implementation of regression-based algorithms to devise a time-series pattern for message receiving, as well as anomalies detection.

Resources may also be preventively allocated for peak hours as well. However, because different peaks can occur at different hardware resources of the network, timestamp signatures may be added to each message, and in each step in the chain. Accordingly, it may be possible to track for each message when the information was initially produced by an AP, when the information was sent to the cloud, when the information was forwarded to the I/O Buffer, when the information was read from the I/O Buffer, when the information was stored in the data warehouse, etc.

Proper mechanisms may be implemented to track the overall performance of queue management in a time-series database in order to devise the expected behavior by using AI techniques (neural networks, fuzzy logic, etc.), and take the appropriate measures to mitigate undesired behaviors. For example, due to the delay-tolerant nature of some data, one peak of arrival of messages at, for example, 9 AM at the Cloud may have repercussions at a later stage in the remaining nodes of the Cloud. Therefore, triggering counter-measures to ensure the QoS may be done at different points in time. A peak hour, for a given service, may then be computed by an abnormal number of incoming messages in a given period of time/client/vnetwork.

Policies may be applied to manage the load of the queues either by launching more consumers or discarding messages according to the QoS for the customers. Accordingly, the queue manager may, for example, not throttle the rate of publications from the customer's point of view. Rather, the rate of consumption may be limited by limiting the number of consumers/handlers.

If any buffer becomes full, a determination may need to be made on whether to have automatic insertion (write) to the database (DB), what information should be discarded, or whether to make a change and evaluate (pay attention) if everything starts to work as expected, or converges to the expected. Various embodiments of the disclosure may allow the queue manager ensure that the resources it consumes stay within the limits of the hardware where it is installed. This may be done, for example, by implementing parameters that cause a message to be tagged as no longer valid. A message can be discarded for various reasons in an implementation. For example, if the message is older than a maximum time-to-live parameter, if there are too many newer messages and disk limitations imply rejecting older ones, if processing the message triggered an unexpected error, if vehicles to which the APs belong have a geolocation stamp outside the boundaries of where it is supposed to operate, or if the content fails any validation step (e.g., traffic values are negative, location points to [0.000, 0.000], etc.).

When one or more of these conditions are reached, messages may be moved to a second queue that may provide different handling than the first queue. The performance of the whole queue manager cluster, including monitoring the number of messages that are tagged as no longer valid, may be monitored via an HTTP server, which may be included in the queue manager implementation by, for example, default. Depending on an embodiment, the messages in the invalid message queues may be discarded, held in queue for later analysis, or stored in a database as "raw" content so that no information is lost.

Figure 10:
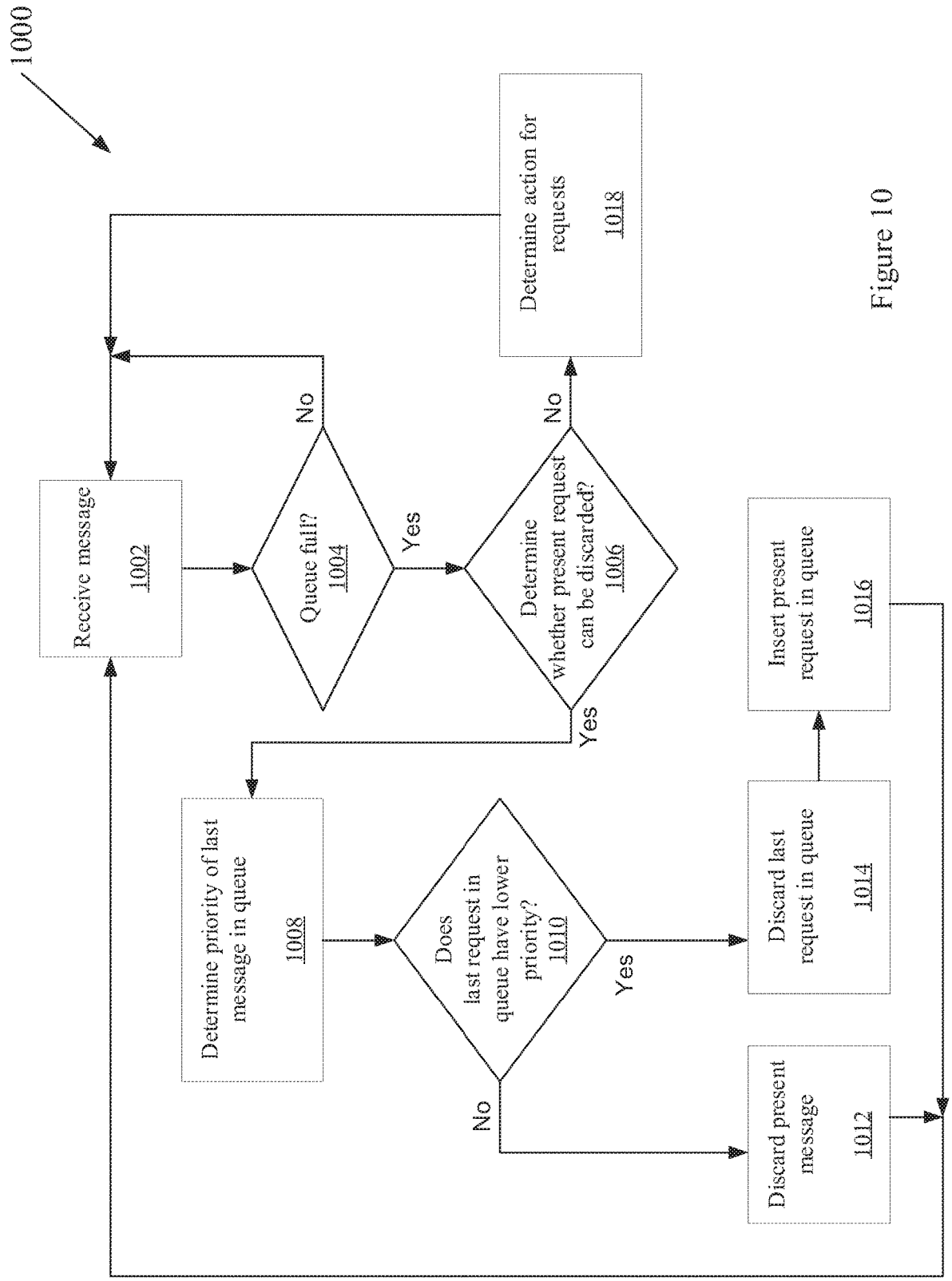
FIG. 10 shows a flow diagram of operation for a full buffer, in accordance with an example embodiment of the disclosure.

FIG. 10 shows a flow diagram of operation for a full buffer, in accordance with an example embodiment of the disclosure. The flow diagram 1010 shown in FIG. 10 may be performed by, for example, the example networks and/or network components 100, 200, 300, 400, 500-570, 600, 700, and 800 discussed herein. However, it should be understood that the flow diagram 1000 is described as one example process that may be used, and various embodiments need not be so limited.

The example embodiment described by the flow diagram 1000 may refer to, for example, requests (messages) 801 that arrive at an HTTP server that has the I/O Buffer 806. Referring to the flow diagram 1000, at 1002, a present request 801 may be received to be stored in a queue 808.

At 1004, a determination may be made as to whether a destination queue 808 for which the request is destined is full. The destination queue 808 for the request 801 may be determined, for example, as described with respect to FIGS. 9A and 9B. If the destination queue 808 is not full, the present request 801 may be put in the appropriate slot of the destination queue 808, and the process will go back to 1002 to wait for more messages.

If the destination queue 808 is full, a next step may be to determine at 1006 if the present request 801 can be discarded. An appropriate scenario may be, for example, if the present request 801 is DT and/or has a very low priority. If so, at 1008, the priority of the request at the end of the destination queue 808 may be determined.

At 1010, the priority of the request at the end of the destination queue 808 may be compared to the priority of the present request 801. If the request at the end of the destination queue 808 does not have a lower priority, then at 1012 the present request 801 may be discarded. If the request at the end of the destination queue 808 has a lower priority, then at 1014 the request at the end of the destination queue 808 may be discarded. At 1016 the present request 801 may be slotted into an appropriate position of the destination queue 808.

Returning to 1006, if the present request 801 cannot be discarded, then appropriate actions may be taken 1018 regarding the requests in the present queue 801. For example, an embodiment may immediately take action on the pending requests in the present queue 801. Other embodiments may wait until one or more messages arrive before taking further action. This may depend on, for example, present states of the various parts of the Cloud (the servers, the database, etc.) and a likelihood of the present queue 801 clearing up. Various embodiments may implement different schemes.

For example, if the destination queue 808 is full, an alternative may be, for example, putting the present request 801 in another queue with different or same priority.

An embodiment may have an architecture configured to handle a client that starts to send more requests than expected. The HTTP server, which may be included in the queue manager implementation, may allow monitoring of the status of each queue. Once a set of consumers for a given client is not able to cope with an unexpected number of requests, various policies may be applied. For example, the number of requests may be throttled after a specific limit, or more consumers may be automatically launched until the number of pending messages converges to zero. This behavior may result in extra cost to the customer, and may be configurable by the customer and/or the provider.

As can be seen from the descriptions provided so far, various aspects of communication may be improved with respect to communicating via a network and maintaining the network for communication in light of, for example, changing user traffic. Further advantages include providing security of the information handled in accordance with certain aspects of this disclosure. For example, information may be sent by the nodes by establishing an SSL tunnel between each node and a provider so that each node is provided a certificate for its own use.

As explained previously, various embodiments of the disclosure may have network logic separated from processing logic to allow for faster responses to the users as well as better handling of the requests. The RESTful API may be agnostic to the amount of processing each message takes, and may act as a message router to the queue manager. On the queue manager side, consumers may be able to scale up based on performance metrics provided by the queue manager API. Increasing the number of consumers may allow processing of more messages, but at the cost of additional hardware. Fewer consumers may induce a lag in message processing, thus leading to inaccurate metrics.

The RESTful API may deal with data from both the network and the data warehouses by means of API requests. This may serve to isolate the logic into smaller, self-contained services, which may greatly enhance not only the development process, but also may promote sharing of the hardware resources. Different machines may host different pieces of the API set of services, and a proper reverse proxy tool may route the requests to the appropriate resources, which may help load balance across different regions/instances.

Individual services may be launched to save hardware resources, as well as launching a whole set of services. Launching one service or a smaller number of services may also be particularly useful in the development process as the boundaries for each process are well known.

Prioritization may allow dealing with customers of different requirements, and promote allocation of adequate hardware resources to meet each customer's requirements. It may also be possible to predict hardware resources needed at a given time of the day/week to provide adequate QoS for the customers. APs may be deployed so that they connect to the nearest RESTful API to ensure minimum latency between, for example, the vehicle network and the Cloud.

Increasing the quantity of information produced by the network may have, for example, a slight impact in the RESTful APIs since computational expense may be calculated at the I/O Buffer consumers.

Encrypted communication may be used to ensure both security and authenticity of the information.

Customers may be able to set real-time requirements for the data to be processed. For example, a customer may select to have each request reach the database in at most 100 ms. The customer may be able to select specific parameters from a menu or an interactive user interface that relates to QoS. Another option for customers may be selecting to consider some data (i.e., traffic information) more relevant if processed as soon as possible, prior to other metrics.

Some customers may have bus fleets that follow predictable paths. Since the location of the access points across a city may generally be well known, it may be possible to predict the reception of delay tolerant data.

Full integration with cloud provider APIs may be made for virtual machine monitoring. A user interface may be provided to a customer to configure the several parameters. Proper high-availability mechanisms may be implemented to ensure redundancy of data across multiple queue manager servers.

Accordingly, an embodiment of the disclosure may be a communications system communicatively coupled to a network, the communication system comprising representational state transfer compliant (RESTful) application programming interfaces (APIs) configured to receive requests to access at least one HTTP server from at least one node and to respond to the requests. The communication system may also comprise at least one I/O buffer configured to receive at least one message sent by at least one of the RESTful APIs, where the RESTful APIs may be configured to respond to the requests and to send the at least one message to the at least one I/O buffer, and at least one monitoring node configured to generate analytics regarding activity of the RESTful APIs.

Another embodiment of the disclosure may be a method for communicating with a network, the method comprising receiving, by representational state transfer compliant (RESTful) application programming interface (API), from at least one node a request to access at least one HTTP server. The RESTful API may then send a response to the request, and also send a message to at least one I/O buffer to handle the request. At least one monitoring node may also generate analytics regarding activity of the RESTful API.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222, 077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A communications system communicatively coupled to a network, the communication system comprising:
   one or more Cloud-based servers comprising or configured to implement:
   representational state transfer compliant (RESTful) application programming interfaces (APIs) configured to receive requests to access at least one HTTP server from at least one node and to respond to the requests;
   at least one I/O buffer configured to receive at least one message sent by at least one of the RESTful APIs, wherein the RESTful APIs are configured to respond to the requests and to send the at least one message to the at least one I/O buffer; and
   at least one monitoring node configured to generate analytics regarding activity of the RESTful APIs, wherein:
   the at least one monitoring node is configured to determine whether to scale up or scale down hardware resources in the communication system based on the analytics; and the at least one monitoring node is configured to utilize one or both of preventive and resolutive mechanisms in adapting policies for determining an ability of at least one resource to scale; and wherein the at least one monitoring node changes handling of the requests depending on at least a number of the requests to process and a trend of the number of the requests to process with respect to zero.

2. The communication system of claim 1, wherein the at least one node is in a vehicle.

3. The communication system of claim 1, wherein each of the requests received by the RESTful APIs is prioritized according to a type of each of the requests.

4. The communication system of claim 3, wherein the type of each of the requests comprises identifying a corresponding data as real-time data or delay-tolerant data.

5. The communication system of claim 3, wherein the type of each of the requests comprises a state of a priority flag in the at least one of the requests.

6. The communication system of claim 3, wherein the type of each of the requests comprises a status of the at least one node sending the each of the requests.

7. The communication system of claim 3, wherein at least one parameter of the type of each of the requests is changed by a user of the at least one node.

8. The communication system of claim 1, wherein the I/O buffer comprises at least one real-time data queue and one delay-tolerant data queue.

9. A method for communicating with a network, the method comprising:

receiving, by representational state transfer compliant (RESTful) application programming interface (API), from at least one node a request to access at least one HTTP server;

sending, by the RESTful API, a response to the request;

sending, by the RESTful API, a message to at least one I/O buffer to handle the request;

generating analytics by at least one monitoring node regarding activity of the RESTful API; and determining, by the at least one monitoring node, whether to scale up or scale down hardware resources in a network based on the analytics, wherein the determining comprises utilizing one or both of preventive and resolutive mechanisms in adapting policies for determining an ability of at least one resource to scale;

wherein the at least one monitoring node changes handling of requests depending on at least a number of the requests to process, a trend of the number of the requests to process with respect to zero.

10. The method of claim 9, wherein the at least one node is in a vehicle.

11. The method of claim 9, comprising prioritizing the requests received by the RESTful APIs according to a type of the requests.

12. The method of claim 11, wherein the type of each of the requests is one of at least real-time data and delay-tolerant data.

13. The method of claim 11, wherein a priority flag in each of the requests indicates the type of the requests.

14. The method of claim 11, wherein the type of the requests depends on a status of the at least one node sending the each of the requests.

15. The method of claim 11, wherein the type of the requests from the at least one node is changed dynamically by a user of the at least one node.

16. The method of claim 9, wherein the I/O buffer comprises at least one real-time data queue and one delay-tolerant data queue.

* * * * *